United States Patent [19]

Weinstein et al.

[11] 4,454,757

[45] Jun. 19, 1984

[54] WIND SPEED AND DIRECTION MEASURING INSTRUMENT

[75] Inventors: Albert Weinstein, Alexandria, Va.; Michael A. Skeen, Alameda; John L. Connell, San Francisco, both of Calif.

[73] Assignee: Davis Instruments Corporation, San Leandro, Calif.

[21] Appl. No.: 415,740

[22] Filed: Sep. 7, 1982

[51] Int. Cl.³ ............................................. G01F 1/28
[52] U.S. Cl. .................... 73/189; 73/861.76; 73/430
[58] Field of Search ............... 73/189, 186, 861.76, 73/202, 430; 116/273, 274

[56] References Cited

U.S. PATENT DOCUMENTS

| | | | |
|---|---|---|---|
| 2,207,747 | 7/1940 | Manarik et al. | 73/861.76 X |
| 2,315,185 | 3/1943 | Boyle | 73/202 |
| 2,889,707 | 6/1959 | Snider | 73/189 |

Primary Examiner—Charles A. Ruehl
Assistant Examiner—Brian R. Tumm
Attorney, Agent, or Firm—Albert Weinstein; Michael L. Skeen; John L. Connell

[57] ABSTRACT

A portable, pocket sized instrument for measuring wind speed and indicating wind direction wherein a multiple number of vanes of varying size and spacing are radially and orthogonally fixed to a disc and wherein the force of the wind against the vanes causes the disc to rotate against the restraining torque of a spring. Wind speed is indicated by angular rotation of the disc and wind direction is indicated by the orientation of the instrument at the time of maximum reading. A foldable handle protects the mechanism and increases the convenience of positioning the instrument.

1 Claim, 7 Drawing Figures

WIND SPEED AND DIRECTION MEASURING INSTRUMENT

SUMMARY

A portable, pocket sized instrument for measuring wind speed and indicating wind direction wherein a multiple numer of vanes of varying size and spacing are radially and orthogonally fixed to a disc and wherein the force of the wind against the vanes causes the disc to rotate against the restraining torque of a spring. Wind speed is indicated by angular rotation of the disc and wind direction is indicated by the orientation of the instrument at the time of maximum reading. A foldable handle protects the mechanism and increases the convenience of positioning the instrument.

1. Field of the Invention

The invention pertains to the art of wind speed and direction measuring instruments of the portable type which can be hand held and easily stored.

2. Description of the Prior Art

Those conversant with the art of wind measuring instruments are aware that many different designs have been developed employing various physical principles and arrangements. As examples, Dwyer U.S. Pat. No. 2,993,374 balances the height to which a very light plastic bead rises against the wind pressure. Electric static on the bead or moisture it absorbs tends to make the unit inoperative. Furthermore, the lack of damping allows the bead to strongly oscillate about its average position making it difficult to read, especially under gusty conditions. Simerl, U.S. Pat. No. 4,102,188, uses rotor cups whose rate of rotation when exposed to the wind drives an electric meter. The exposed rotor cups, particularly when rotating at high speed are subject to breakage should they strike some object while being hand held and may cause some injury to the fingers of the holder. Furthermore it can only indicate wind speed but not wind direction. Snider, U.S. Pat. No. 2,889,707 and Beckman, U.S. Pat. No. 3,877,303 each use a single vane which rotates about a pin but is constrained by a spring. As a consequence of their design the vane is limited to an angular rotation of less than 90°. As a result of the limited degree of rotation the accuracy and resolution of readings, particularly at low air speeds, is poor.

OBJECTIVES

The principal objective of this invention is to provide a portable instrument that is capable of measuring wind speed and indicating wind direction. It is a further objective to produce accurate and readable indications at very low wind speeds, of less than 5 miles per hour, as well as high wind speeds of 60 miles per hour on a single scale. Another objective is to contain and protect the moving elements of the instrument entirely within an enclosure. Still another objective is to optimally damp the motion of the speed indicating dial so that the instrument is easily used in all wind conditions, including gusty conditions. These and other advantages will become apparent from the accompanying drawings and description.

DRAWING DESCRIPTION

In the drawings:

FIG. 1 is a perspective view of the Instrument.
FIG. 2 is a section taken on line 2—2 of FIG. 1.
FIG. 3 is a sectional view taken on line 3—3 of FIG. 2.
FIG. 4 is a sectional view taken on line 4—4 of FIG. 2.
FIG. 5 is an enlarged fragmental section view of one bearing.
FIG. 6 is an enlarged fragmental section view of another embodiment of the bearing.
FIG. 7 is a front elevation of the disc.

DESCRIPTION OF PREFERRED EMBODIMENT

Figure 1:
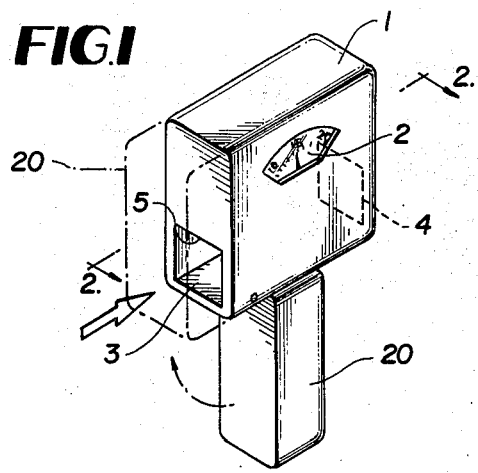

Although it is recognized that other configurations are possible, the drawings represent one specific embodiment of the invention.

Referring to the drawings:

FIG. 1 is a perspective view of the device. It consists of an essentially hollow rectangular case 1 which could be made of various materials, plastic being preferred and a foldable handle 20 which in the upward or folded position protects the inlet port 3 of the instrument and in the downward or unfolded position provides a convenient means of orienting the instrument into the wind.

Figure 2:
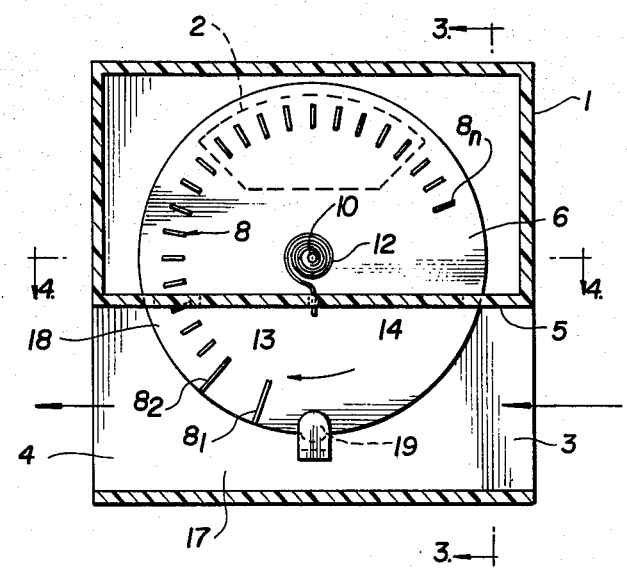
Figure 7:
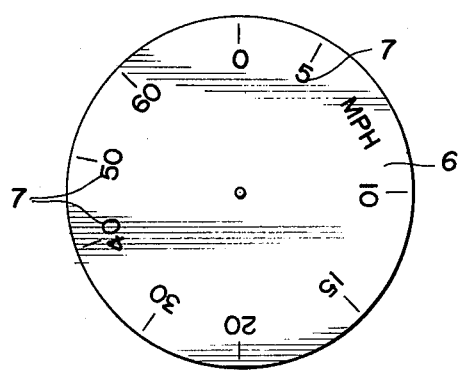

On one face of the case 1 is a transparent window 2 which allows viewing of the internal readings. At the lower portion of the front end of case 1 is said inlet port 3 which admits the wind. At the opposite end of case 1 is an exit port 4 which allows the wind to escape. In FIG. 2 it is seen that connecting the inlet and outlet ports is a baffle 5 which forms a channel 17 with the bottom and sides of case 1 thru which the wind travels. Except for this channel all sides, top and bottom, of case 1 are closed. Mounted internal to the case is a thin disc 6, indicated by dotted lines. On the face of disc 6 are inscribed a set of numbers 7 as shown in FIG. 7. These represent wind velocity in miles per hours or meters per second or any other suitable velocity scale. A second or dual scale properly calibrated can also be printed in addition to the first scale but is not shown.

Figure 3:
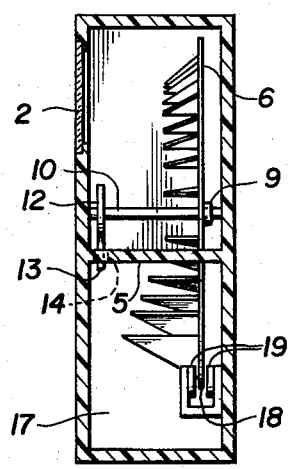
Figure 4:
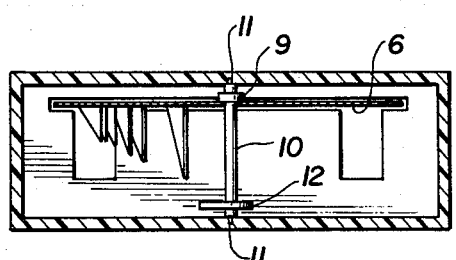

Disc 6, preferably made of aluminum, contains a multiple number of vanes 8 which are orthogonal to its face as seen in FIGS. 3 and 4. The height and area of each vane becomes progressively smaller, the first vane being the largest, until a suitable minimum size is attained.

The radial distance from the center of disc 6 and the angular separation between the vanes is also varied. The first and second vanes, $8_1$ and $8_2$, extend to the edge of the disc whereas the outer tip of the remainder of the vanes terminate within about ¼" of the outer edge of the disc. Thus it can be seen that except for vanes $8_1$ and $8_2$ there is a clear annular rim, 18, of about ¼" in depth around the edge of the disc. Mangets, 19, are placed on each side of the rim thereby creating a strong magnetic field through the aluminum rim. Motion between the aluminum rim and magnets create electric eddy currents which tend to oppose the motion of the disc and damp the amplitude of its oscillations.

As seen in FIGS. 3 and 4, disc 6 is physically fixed by means of collar 9 onto shaft 10 which has at each end very narrow diameter pins 11. Also physically mounted and fixed at its center to shaft 10 is a spiral spring 12. As viewed in FIG. 3 the outer end 13 of spiral spring 12 is held fixed in slot 14 of baffle 5.

Figure 5:
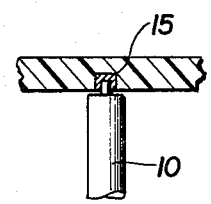
Figure 6:
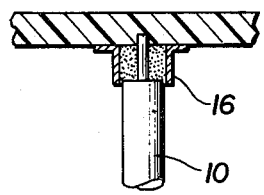

Referring to FIGS. 3, 4 and 5 it is seen that shaft 10 with pins 11 is seated into low friction bearings 15. These bearings can be small diameter holes molded into the plastic or jeweled bearing inserts. FIG. 6 is an enlargement of one of the bearing sections showing cup 16 surrounding pin 11. Cup 16 contains damping grease, not shown, which surrounds pin 11. The viscosity and other characteristics of the damping grease are selected such as to provide good damping without significantly downgrading sensitivity. This damping, primarily for low speeds, complements the higher speed damping of the magnets. FIG. 5 illustrates the other end of the shaft without the grease cup.

When not in operation, handle 20 is folded up against the front end of case 1. In operation, handle 20 is opened downward and the front end of case 1 is held in the direction of the wind. The air current enters inlet port 3 and exerts a force on each of the vanes 8 which are momentarily within channel 17. The total torque tending to rotate disc 6 around bearings 15 is a function of the number of vanes in channel 17, the area of each vane, the radial distance of each vane from the bearing point, and, the square of the velocity of the air stream. Spiral spring 12 resists the rotation of disc 6. Initially at low wind speed, say at 5 miles per hour or less, the large vanes $8_1$ and $8_2$ are within channel 17. Thus although the wind force is at a minimum, the total area of the vanes is a maximum and the resultant torque is sufficient to rotate the disc 6 thru an angle of about 30°. This is adequate to produce an easy reading of wind speed with good resolution. As the wind speed increases, disc 6 rotates and smaller vanes and with a smaller radial distance enter the airstream. As a consequence when the wind speed reaches 60 MPH, disc 6 rotates through an angle of approximately 320°.

If the size of the vanes and their radial distance from the center were not reduced with the disc's rotation in response to increased wind speed, the angular rotation of the disc 6 would increase as the square of the wind speed. Thus a wind speed of 60 MPH would result in a rotation of 60/5×30° which equals 4320° or 12 complete rotations of the disc. However, it is necessary to constrain disc 6 rotation to a single revolution. Through the use of smaller vanes and decreased radial distance, the disc's rotation is limited to 320°. Table A below compares the angle of rotation that would occur if the said vanes 8 were kept constant in size and radial distance versus the angle achieved by varying vane size and distance.

TABLE A

| Wind Speed (MPH) | Constant Vane Size (Degree Rotation) | Varied Vane Size (Degree Rotation) |
| --- | --- | --- |
| 5 | 30 | 30 |
| 10 | 120 | 90 |
| 20 | 420 | 200 |

TABLE A-continued

| Wind Speed (MPH) | Constant Vane Size (Degree Rotation) | Varied Vane Size (Degree Rotation) |
| --- | --- | --- |
| 30 | 1080 | 230 |
| 40 | 1920 | 260 |
| 50 | 3000 | 290 |
| 60 | 4320 | 320 |

It is apparent from Table A that the degrees of rotation for the "varied vanes", as described herein, is non-linear with wind speed. At the wind speeds up to 30 MPH, the disc's rotation is large; that is, at 30 MPH the disc rotates about 230°. Accordingly very good resolution and readability is obtained in the wind speed range of 0-30 MPH which is the range of greatest interest to those who would use this instrument. In the range of 30-60 MPH, the rate of increase in angular rotation with increased wind speed is less. As a consequence the full range of 0-60 MPH is achieved within a single complete revolution of disc 6.

The outer face of disc 6 which can be viewed through window 2, is calibrated with a printed scale of 0-60 MPH. The indicated reading of this scale will be maximum when the instrument is pointed directly into the wind. Thus the wind direction is determined by rotating the entire instrument until a maximum reading is obtained.

It can therefore be seen that the instrument as described can determine the winds speed and direction with high accuracy and resolution particularly at low wind speeds. Furthermore, the instrument being small in size can easily be carried in the pocket of the user.

What is claimed is:

1. A small portable instrument capable of being carried in a shirt pocket for measuring wind speed and indicating wind direction comprising a casing, an inlet port and outlet port with a channel connecting said ports, an aluminum disc with a multiple number of vanes orthogonal to the plane of said aluminum disc, said vanes being graduated in both area and radial distance from the center of said aluminum disc, a shaft fixed to the center of said aluminum disc and orthogonal to its plane, said shaft rotatably residing in bearings of said casing, a spiral spring centered on said shaft, its inner end fixed to said shaft and its outer end fixed to said casing, markings on the face of said aluminum disc relating its angular rotation with the speed of the wind, a transparent window located on the face of said casing in a manner to permit direct viewing of said markings, permanent magnets positioned close to and above and below the outer edge of said aluminum disc to damp its oscillations, a foldable handle with a fulcrum at one corner of said casing, which when closed against the edge of said casing protects said inlet port.

* * * * *